(No Model.)
A. STAECKER.
APPARATUS FOR MEASURING CONTENTS OF COOLING VATS.
No. 590,501. Patented Sept. 21, 1897.
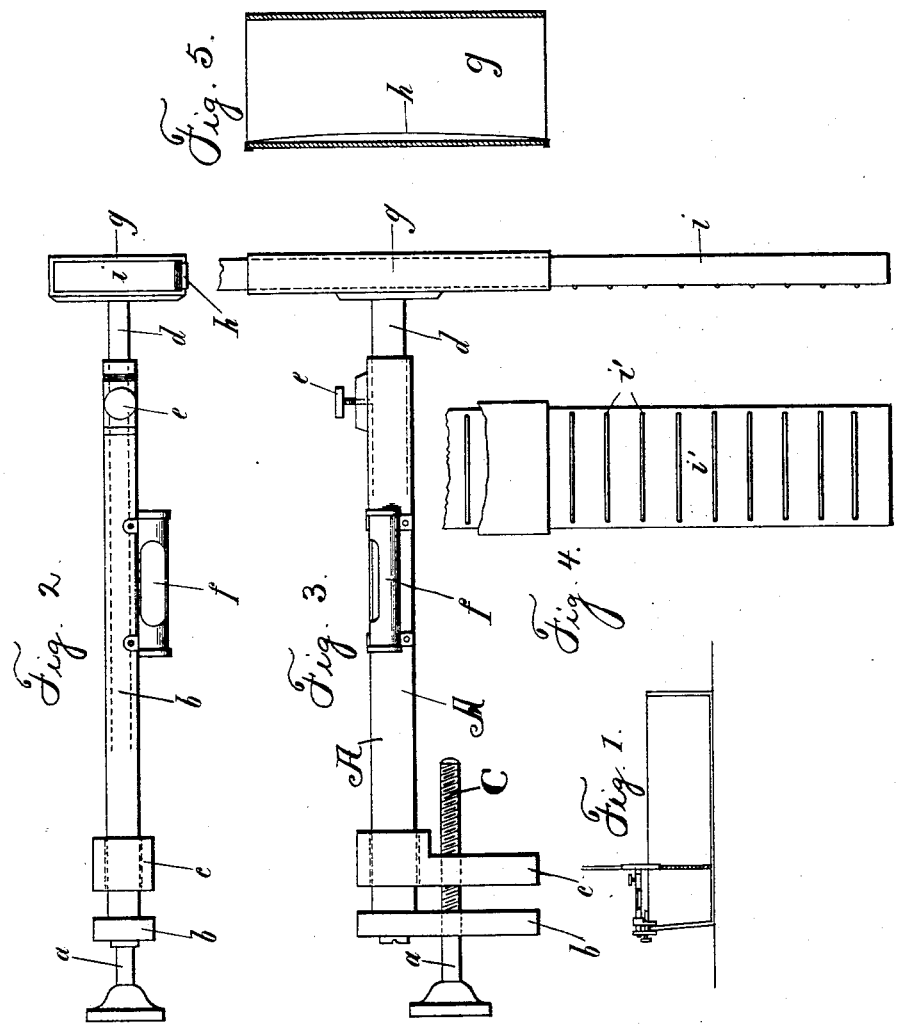

UNITED STATES PATENT OFFICE.

ADOLF STAECKER, OF CHARLOTTENBURG, GERMANY.

APPARATUS FOR MEASURING CONTENTS OF COOLING-VATS.

SPECIFICATION forming part of Letters Patent No. 590,501, dated September 21, 1897.

Application filed September 18, 1896. Serial No. 606,261. (No model.) Patented in Germany December 28, 1895, No. 88,110.

*To all whom it may concern:*

Be it known that I, ADOLF STAECKER, residing at Charlottenburg, near Berlin, in the German Empire, have invented a new and useful Apparatus for Measuring the Capacity of Surface Coolers in Breweries when Containing Liquids, especially for the purpose of State Revenues, (for which I have obtained a patent in Germany, No. 88,110, dated December 28, 1895;) and I hereby declare that the following is a full, clear, and exact description thereof, reference being had to the accompanying drawings, which form part of this specification.

The present invention relates to a device by means of which the liquid contents of cooling-vats in breweries may be measured at any time desired while filling.

The invention consists in the construction and combinations of parts hereinafter described, and illustrated in the accompanying drawings, in which—

Figure 1 is a sectional view of a cooling-vat with the measuring device attached thereto in position for use. Fig. 2 is an enlarged top plan view of the measuring device. Fig. 3 is a side view of the device. Figs. 4 and 5 are details.

As illustrated in the drawings, the device consists of a horizontal bar A, provided with a fixed clamping-jaw $b$ and a movable clamping-jaw $c$ on one end, jaw $c$ being adjustable toward or from jaw $b$ by a screw C. Bar A is provided with a water-level $f$ and has a socket in its inner end, in which is adjustably fitted the tang $d$ of a hollow guide $g$, which may be fastened by a thumb-screw $e$. The guide $g$ stands vertical to bar A, and through it is slipped a graduated rule $i$, the graduations being marked, preferably, by transverse wires or frets $i'$. A spring $h$, Fig. 5, in guide $g$ is arranged to bear against the edge of rule $i$ and hold the latter in any position to which it may be adjusted.

By means of the clamp $a\, b\, c$ the bar A can be secured on the edge of the cooling-vat after having previously adjusted the sliding rule $i$ in the guide $g$. The bar A is leveled by means of the level $f$.

This new device can be made cheaply, is very handy and easy in manipulation, and can be made of iron and wood for measuring cooling-vats while they are filled.

Having thus described my invention, what I therefore claim as new, and desire to secure by Letters Patent thereon, is—

1. The combination of bar A having clamps $a, b, c$, on one end, an adjustable tang $d$ fitted on its other end; and a level $f$ on its side; with the vertical guide $g$ on tang $d$, and the spring $h$ in said guide, and the rule $i$ having frets $i'$ sliding in said guide, all substantially as and for the purpose set forth.

2. The herein-described device for determining the height of the level of the liquid in cooling-vats for breweries, consisting of the bar A provided with a level $f$, and clamping-screw $e$, and a movable clamping-foot $c$ adapted to secure the instrument on the side of the cooling-vat; with the guide $g$ adjustably mounted on bar A, and the measuring-rule $i$, all adapted to be attached to a vat so that it is possible to effect at a determined place the first measurement and also repeated measurements, substantially as and for the purpose described.

In witness whereof I hereunto set my hand in presence of two witnesses.

ADOLF STAECKER.

Witnesses:
F. HITZEROTH,
PAUL ZUCKER.